Patented May 10, 1932

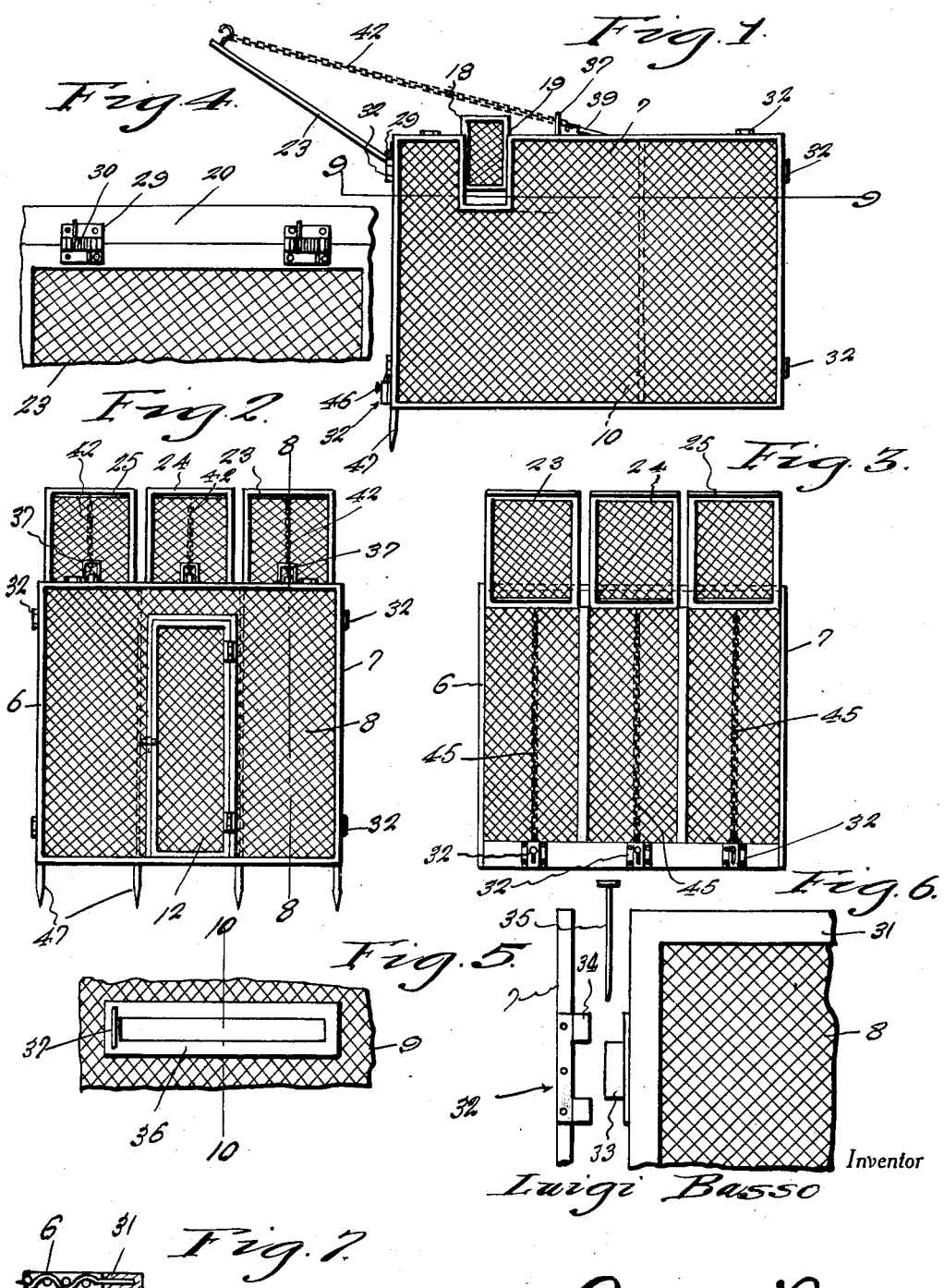

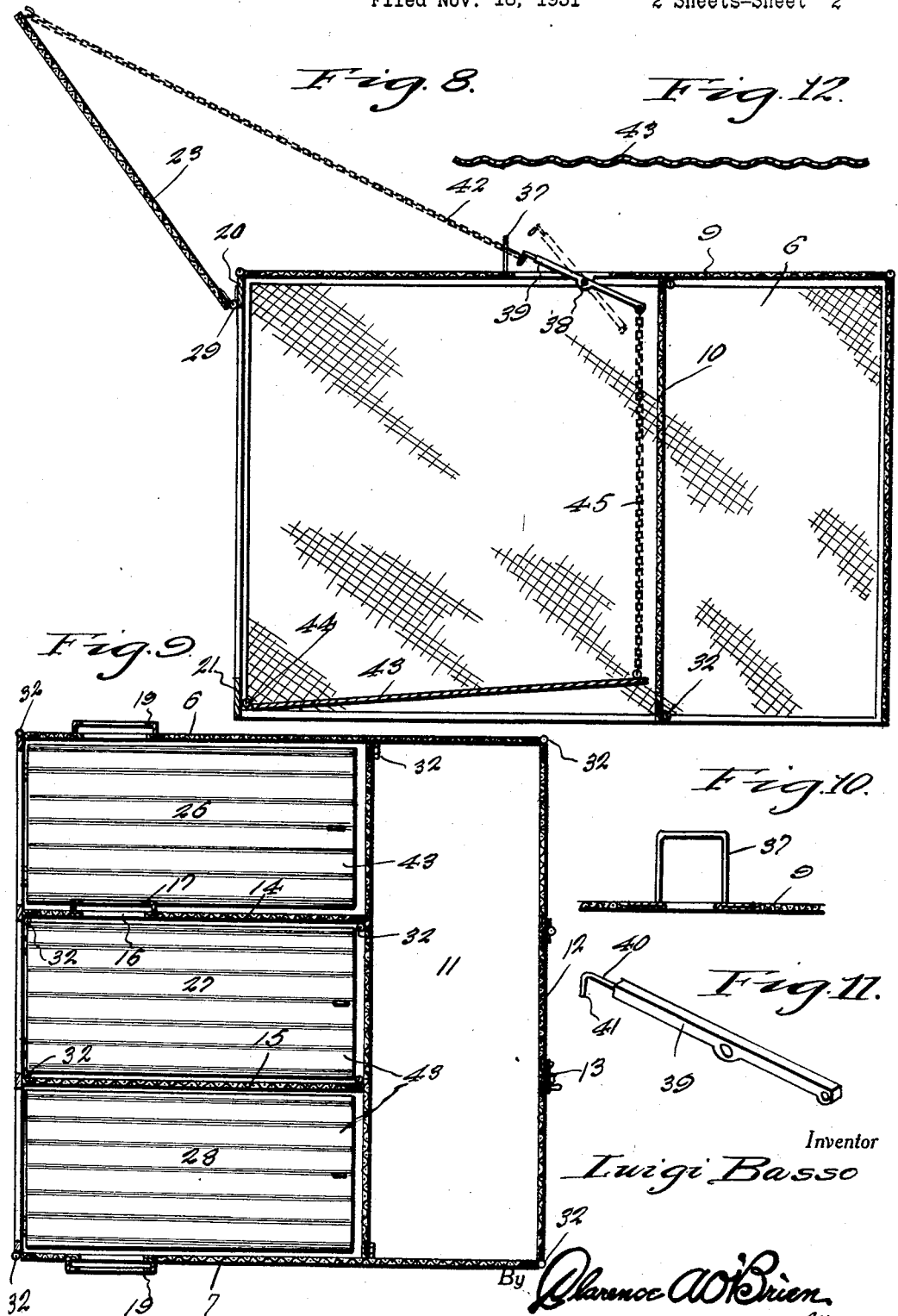

1,857,932

UNITED STATES PATENT OFFICE

LUIGI BASSO, OF HARRISON, NEW YORK

TRAP

Application filed November 18, 1931. Serial No. 575,884.

This invention appertains to new and useful improvements in traps and more particularly to a novel trap of the animal imprisoning type.

The principal object of this invention is to provide a trap in which a live bait compartment is provided common to a plurality of trap compartments.

Another important object of the invention is to provide a trap of the animal imprisoning type wherein the closure releasing means is of extremely simple construction, permitting construction at low cost.

These and other important objects and advantages of the invention will become apparent to the reader of the following specification.

In the drawings:—

Figure 1 represents a side elevational view of the novel trap.

Fig. 2 represents a rear end elevational view of the trap.

Fig. 3 represents a front elevational view of the trap.

Fig. 4 represents a fragmentary front elevational view showing one of the closures.

Fig. 5 represents a fragmentary top plan view of the trap.

Fig. 6 represents a fragmentary elevational view showing one of the hinged connections, whereby the sections of the trap are connected together.

Fig. 7 represents a detail fragmentary sectional view showing the frame for the mesh sections.

Fig. 8 represents a vertical longitudinal section taken substantially on line 8—8 of Fig. 2.

Fig. 9 represents a horizontal sectional view taken substantially on line 9—9 of Fig. 1.

Fig. 10 represents a sectional view taken substantially on line 10—10 of Fig. 5.

Fig. 11 represents a perspective view of the rocker.

Fig. 12 represents a transverse sectional view of one of the swingable tread plates.

Referring to the drawings wherein like numerals designate like parts, it can be seen that this trap includes a pair of side walls as well as a back wall 8 and a top wall 9. Numeral 10 represents a transversely extending vertical partition between the side walls 6—7, and extending outwardly from this partition 10 are the vertical partitions 14 and 15. It will be observed, that the partition 10 in conjunction with the side walls 6—7 and the rear wall 8 forms a live bait compartment 11.

The rear wall 8 is provided with an opening which is normally closed by the door 12, the same being equipped with suitable fastening means 13. The partition 14 is provided with an opening 16 therein adjacent the top thereof and a guide 17 serves to slidably support a closure 18 such as is employed in the guides 19 of the side walls 6—7, the latter also being provided with openings through which the trapped animal or animals can be restrained when it is desired that they be removed from the trap.

At the forward end of the trap, there is located the upper horizontal strip 20 and the lower horizontal strip 21 and as is clearly shown in Figs. 3 and 8, a plurality of closures 23,—24 and 25 are swingably secured to the upper strip 20 by hinges 29, each hinge being equipped with suitable spring means 30, whereby the corresponding closure will be urged downwardly in a rapid movement when released.

Manifestly, the side walls 6—7 with the interposed partitions 14 and 15 define trap chambers 26, 27 and 28, within each of which is a setting mechanism. It will be observed that each of the walls, as well as the top 9, partitions and closures 23, 24 and 25 are mounted within frames 31, each frame having its side portions of U-shape in cross section with the edge portions of the corresponding wall or partition clamped between the flanges of the frame. (See Fig. 7).

Numeral 32 generally refers to a type of connector which is used at desired intervals for connecting the frames 31 together, excepting between the strip 20 and closures 23, 24 and 25, where the aforementioned hinges 29 are employed. This type of connector 32 includes a barrel 33 on one of the sections, and the eyes 34 on the adjacent sections, with the barrel 33 engageable between the eyes to aline the openings therein for receiving the pin 35. In this manner, the wall structures, partitions and top are detachably connected together and can be knocked down when desired for purpose of shipping in a confined manner.

Above each of the trap chambers 26, 27 and 28, the top 9 is provided with an elongated opening within which a rectangular-shaped frame 36 is mounted and equipped at its forward end with an upstanding inverted U-shaped member 37. This frame 36 is provided with depending ears through which the pin 38 extends for rockably supporting the rocker 39, which is provided at its forward end with the reduced extension 40 and the downwardly disposed end portion 41 at the free end thereof, to form a hook engageable with an end link at the rear end of the chain 42, which is disposed through the member 37 and connects at its forward end to the corresponding closures 23, 24 or 25.

Within each of the compartments 26, 27 and 28 is located a tread plate 43 provided with longitudinally extending corrugations for reinforcing the plate against deflecting. The forward end of each of these tread plates 43 is hingedly connected as at 44 to the lower strip 21, while a chain 45 connects the rear end to the remaining end of the rocker 39, so that when the corresponding closure 23, 24 or 25 is set, the tread plate 43 is maintained in the slightly inclined position shown in Fig. 8.

A suitable fastener 46 is provided for each of the closures 23, 24 and 25, whereby they will be retained in closed position, until it is desired to release the animal in the corresponding compartment 26, 27 or 28.

Stakes 47 are provided on the trap at desired points and these are to be driven into the ground to prevent shifting of the trap upon the ground. It can now be seen that in use, the trap can be camouflaged in any desired manner to cover the operating means so that suitable bait such as a sheep or other animal can be placed in the bait compartment 11 and this will serve to attract wild beasts such as wolves, and like animals, without likelihood that the wild animal will detect the existence of the trap.

The wild beasts will endeavor to get into the trap to get at the live bait and in passing into one of the compartments 26, 27 or 28, will step upon the corresponding plate 43. As the wild animal walks rearwardly on the plate 43, his weight will pull down on the chain 45 and when he is sufficiently within the trap, his weight will serve to rock the rocker 39 to the dotted line position shown in Fig. 8, whereupon the downward portion 41 of the extension 40 will disengage from the chain 42, to release the corresponding closure 23, 24 or 25. Obviously, as the hook end of the rocker 39 moves upwardly, there is a tendency to carry the adjacent end portion of the chain 42 in the same direction. However, the chain will abut the bight portion of the inverted U-shaped member 37 which will retain the chain so that the hooked end of the rocker 39 can readily disengage.

Obviously, as the closure swings to a closed position, the catch 46 will retain the closure in this position. The closures 18 on the sides 6 and 7 can be elevated to facilitate extraction of the animals from the chamber in which the same is located. In the event the animal is in the central compartment 27, the closures 19 in the side 6 and partition 14 can be elevated to permit the insertion of suitable means for grasping the animal.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. A trap of the character described comprising a box-like structure provided with a transversely extending partition therein defining a live bait compartment, partitions extending away from the first-mentioned partition for defining imprisoning chambers, a closure for each of the imprisoning chambers, a swingable tread plate in each of the chambers, a rocker arm, a chain extension on each of the closures, said rocker being provided with a hook for engagement with the corresponding chain extension, and a chain connection between the free ends of the tread plates and the said rocker.

2. A trap of the character described comprising a box-like structure, a partition in the structure for dividing the same into a live bait compartment, and an imprisoning chamber, a swingable tread plate in the imprisoning chamber, a rocker, a flexible connection between the tread plate and one end of the rocker, the opposite end of the rocker being provided with a hook, a closure for the imprisoning chamber, a chain extension for the closure, said hook being engageable with the free end of the chain extension.

3. A trap of the character described comprising a box-like structure, a partition in the structure for dividing the same into a live bait compartment, and an imprisoning chamber, a swingable tread plate in the imprisoning chamber, a rocker, a flexible connection between the tread plate and one end of the rocker, the opposite end of the rocker being provided with a hook, a closure for the imprisoning chamber, a chain extension for the closure, said hook being engageable with the free end of the chain extension, and an abutment for limiting upward motion of the chain extension and at the point where the hook is engageable therewith.

4. A trap of the character described comprising a box-like structure, a partition in the structure for dividing the same into a live bait compartment, and an imprisoning chamber, a swingable tread plate in the imprisoning chamber, a rocker, a flexible connection between the tread plate and one end of the rocker, the opposite end of the rocker being provided with a hook, a closure for imprisoning chamber, a chain extension for the closure, said hook being engageable with the free end of the chain extension, and spring means for urging the closure downwardly when released.

In testimony whereof I affix my signature.
LUIGI BASSO.